Aug. 9, 1949.   E. W. HALBACH   2,478,823
INJECTION MOLDING MACHINE HAVING ADJUSTABLE MECHANISM
WITH INTERCHANGEABLE MOLD ASSEMBLY
Filed Sept. 6, 1945   2 Sheets-Sheet 1
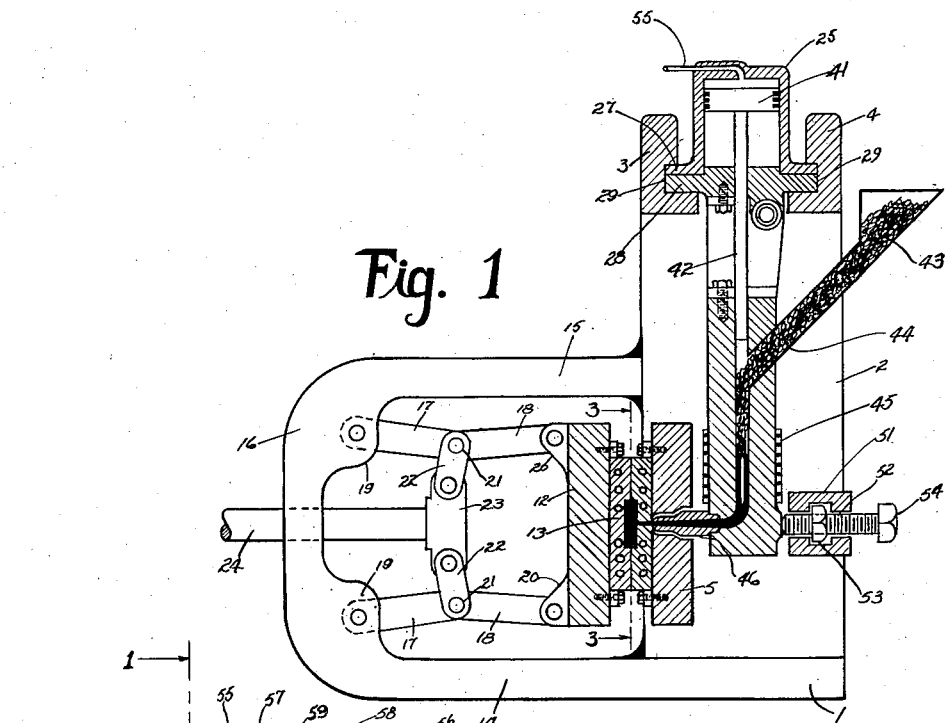
Fig. 1
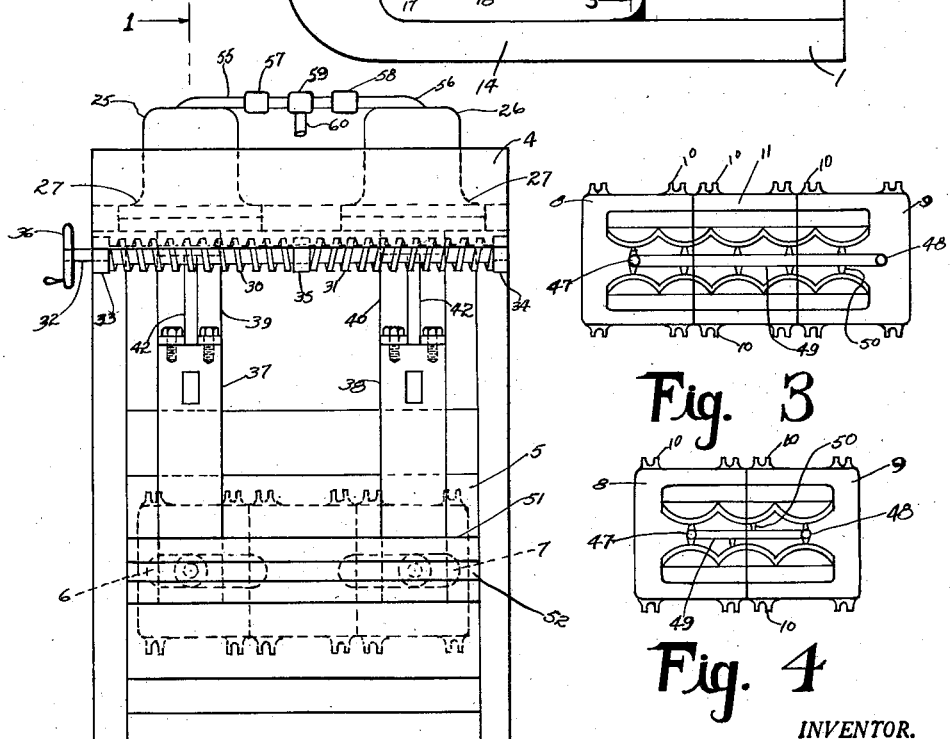
Fig. 2
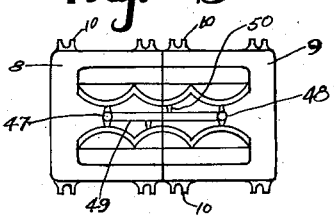
Fig. 3
Fig. 4
INVENTOR.
Ernest W. Halbach
BY
Heard Smith & Tennant
Atty's.

INVENTOR.
Ernest W. Halbach
BY
Heard Smith + Tennant
Atty's.

Patented Aug. 9, 1949

2,478,823

UNITED STATES PATENT OFFICE 2,478,823

INJECTION MOLDING MACHINE HAVING ADJUSTABLE MECHANISM WITH INTERCHANGEABLE MOLD ASSEMBLY

Ernest W. Halbach, Andover, Mass., assignor to The Bolta Company, Lawrence, Mass., a corporation of Massachusetts Application September 6, 1945, Serial No. 614,676

3 Claims. (Cl. 18—30)

This invention relates to injection moulding mechanism and the general object of the invention is to provide an apparatus which can be more rapidly operated and which will produce more uniform castings than have heretofore been obtained.

More specifically one of the objects of the invention is to provide an injection moulding apparatus with a plurality of pairs of complementary die sections having their cavities in communication with a plurality of means for supplying mouldable material simultaneously to different pairs of mould sections thereby more rapidly filling the cavities of the moulds and causing a corresponding increase in the number of articles produced in each cycle, and also insuring complete filling of the moulds thus avoiding imperfect castings.

A further object of the invention is to provide a construction having end complementary pairs of detachably mounted mould sections and intermediate pairs of mould sections arranged in abutting relation with a runner leading to all their cavities communicating with adjustable means for simultaneously supplying mouldable material to the ends of the runners in the end mould sections and thence to the cavities of all of said mould sections, thereby to produce a casting of any desired length.

A further object of the invention is to provide a construction which will insure complete filling of long or large mould cavities or sets of mould cavities.

More specifically the invention relates to mechanism for casting articles of plastic material adapted to produce articles of various length and size and which may be more rapidly and efficiently operated.

These and other objects and features of the invention will more fully appear from the following description and the accompanying drawings and will be particularly pointed out in the claims.

A preferred embodiment of the invention is illustrated in the accompanying drawings for casting decorative borders but it will be understood that the principle of the invention herein described and claimed may be applied to any injection mechanism for which it is adapted.

In the drawings:

Fig. 1 is a rear view of a machine embodying the invention;

Fig. 2 is a vertical sectional view on line 2—2 Fig. 1;

Fig. 3 is a detail view of two assembled mould sections for simultaneously casting decorative borders;

Fig. 4 is a similar view of a series of assembled end and intermediate mould sections of the same character.

Figure 5:
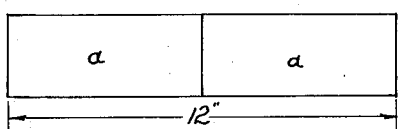
Figs. 5, 6, 7, 8, 9, 10, 11, and 12, illustrate different assemblages of mould sections for moulding articles of different lengths by reason of the adjustability of the injection mechanism.
Figure 6:
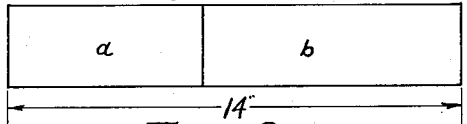

Usual machines comprise a stationary mould section and a relatively movable mould section with a single means for supplying mouldable material to the cavities of the cooperating moulds. The present invention comprises broadly providing a construction having a plurality of pairs of detachably mounted complementary mould sections with the cavities and runners thereof in communication and relatively adjustable means for simultaneously supplying mouldable material to a plurality of the assembled mould sections, the construction being such as to enable the complementary pairs of end mould sections to be mounted in abutting relation with their cavities communicating or widely spaced apart with one or more intermediate mould sections interposed therebetween in abutting relation, with adjustable means for enabling mouldable material, such as molten metal or suitably heated plastic material, to be simultaneously introduced into the runners of the end moulds under pressure, thus quickly and completely filling the runner sections and communicating cavities of all the moulds.

The preferred construction illustrated in the drawings comprises a frame having a base 1, and standards 2 extending at right angles to the base, with parallel beams 3 and 4 uniting the standards at a suitable distance above the base. A stationary die plate 5, which extends in parallelism with the base 1, is welded to or otherwise fixedly secured to the standards 2 and is provided in proximity to its ends with parallel slots or apertures 6 and 7. The mould sections, which are detachably secured to the stationary die plate, comprise end mould sections 8 and 9 having laterally extending pairs of recessed bosses 10 by which they are secured to the stationary mould sections by machine screws or bolts, as illustrated in Figs. 1 and 4. One or more intermediate mould sections 11 of any desirable length having similar bosses 10 are adapted to be detachably secured to the stationary die plate with their respective ends abutting the end sections and the runners and cavities of all communicating as shown in Figs. 1 and 4. A complementary relatively movable die plate 12 has similarly secured to it mould sections 13 which are complementary respectively to the mould sections 8 and 9, or 8, 9, and 11 above described.

Any suitable means may be provided for actuating the movable mould section releasably to clamp the complementary mould sections together. As illustrated in Fig. 2 a usual form of toggle construction is employed which comprises a bracket or housing having a base 14 which is suitably secured to the base 1 and arms 15 which are suitably secured to the standards, the base and arms being connected by a heavy plate 16 preferably integral with said arms. Pairs of toggle links 17 and 18 are pivotally mounted respectively upon bosses 19 of the plate 16 and bosses 20 of the movable die plate 12 and at their adjacent ends are pivotally connected by pins 21 to links 22 which in turn are pivotally connected to a crosshead 23 having a piston 24 which is operated by hydraulic mechanism (not shown). By reason of this construction toggle mechanism may be operated releasably and detachably to clamp the moulds of the movable die plate upon the complementary stationary moulds of the stationary die plate 5.

Means for supplying mouldable material to the moulds comprises a pair of hydraulic cylinders 25 and 26 having laterally extending flanges 27 which are connected to cylinder heads 28, the heads and flanges being slidably mounted in guideways 29 in the parallel beams 3 and 4.

Suitable means are provided for relatively adjusting the hydraulic cylinders lengthwise of the beams 3 and 4. As illustrated herein the cylinder heads 28 are provided with reversely arranged screw threaded portions which are respectively engaged by screws 30 and 31 of opposite pitch on a shaft 32 which is mounted in suitable end bosses 33 and 34 on the standards 2 and a central boss 35 projecting from the beam 4. The shaft 32 is provided with a hand wheel 36 by means of which the shaft 32 may be rotated to move the hydraulic cylinders toward and from each other. Cylinders 37 and 38 are supported by suitable brackets 39 and 40 on the respective cylinder heads 28 and the cylinders are each provided with a piston 41 having a piston rod or plunger 42 which closely fits the bore of the cylinder.

Suitable means are provided for supplying mouldable material to the respective cylinders, such for example as a hopper or inclined conduit 43 which communicates with a suitable inclined passage 44 leading to the bore of the cylinder. In order properly to heat or to maintain the mouldable material in suitable molten condition an electric heating coil 45 surrounds suitable portions of the respective cylinders.

The respective cylinders 37 and 38 are provided with nozzles 46 which extend through the respective apertures 6 and 7 in the stationary die plate 5 and communicate respectively with the passages 47 and 48 in the end dies of the respective stationary mould sections which lead to the mould cavity as shown in Fig. 4, or, as illustrated in Fig. 3, also, to a runner 49 having branches 50 leading to the mould cavities. Suitable means are provided for forcibly holding the nozzles against and in registry with the passages 47 and 48 of the end mould sections. As illustrated herein a fabricated beam 51 is welded or otherwise secured to the standards 2 and is provided with a longitudinally extending channel 52 the longitudinal axis of which is in the plane of the axes of the nozzles. Nuts 53 are slidably mounted in the channel 52 and screws 54, which extend through and are engaged by the nuts 53, abut at their ends against the cylinder in axial alinement with the nozzle. By setting up these screws the nozzles can be forcibly clamped against the stationary die plate with the apertures in the nozzle in correct alinement with the passage or sprue hole leading to the cavities or to a runner communicating with the cavities of the respective end moulds.

In the operation of the device molten material, such as metal in molten condition or granular plastic material, is supplied through the conduit 43 to the chamber of the cylinder 44 and is maintained in or heated to a proper flowing condition by the electric heating coil 45.

Suitable means are provided for forcing the molten material into the cavities of the moulds under high pressure which, as illustrated herein, comprises the hydraulic cylinders 25 and 26 respectively supplied by fluid under pressure through pipes 55 and 56 connected by suitable adjustable unions 57 and 58 to a common conduit 59 which is supplied by liquid under pressure through a pipe 60 leading from the compressor (not shown), and which actuate the pistons of the respective cylinders 37 and 38 when properly adjusted to force the mouldable material simultaneously into the end sections of the mould and thereby rapidly and quickly to fill the communicating cavities of the mould.

One of the objects of the invention is to provide a minimum number of suitable moulds which may be assembled to mould articles of progressively uniformly increased lengths thereby to save the expense of making a large number of single moulds of various lengths. As illustrative of the present invention various assemblages of four sets of moulds are illustrated in Figs. 5–12 inclusive adapted to mould decorative borders such as are illustrated in Figs. 3 and 4 varying in length from 12 to 24".

Figure 7:
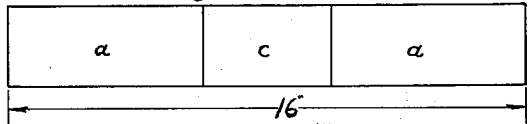

As illustrated in Fig. 5 the mould sections $a$ correspond to the mould sections 8 and 9 shown in Fig. 3 and which are each of 6" length. In the construction shown in Fig. 6 one of the sections $a$ is of 6" length and $b$ of 8" length making an overall dimension of 14". In Fig. 7 a shorter mould section $c$ 4" in length is interposed between two of the 6" mould sections $a$ making the assembled mould sections 16" in length.

Figure 8:
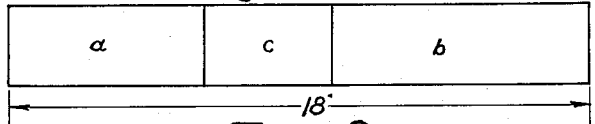

In Fig. 8 the mould sections $a$, $c$ and $b$ are assembled in alinement making the mould section 18" in length.

Figure 9:
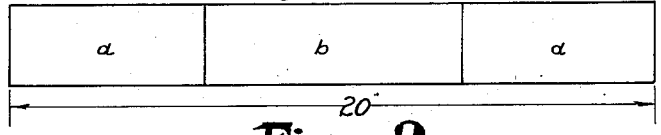

In Fig. 9 two mould sections $b$ are assembled in alinement with mould section $a$ making a mould 20" in length.

Figure 10:
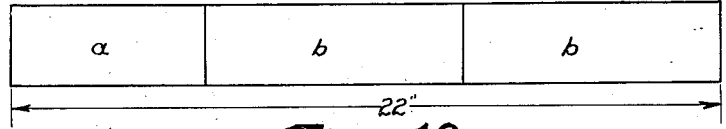

In Fig. 10 two mould sections $b$ and one intermediate mould section $a$ are assembled in alinement making a mould 22" in length.

Figure 11:
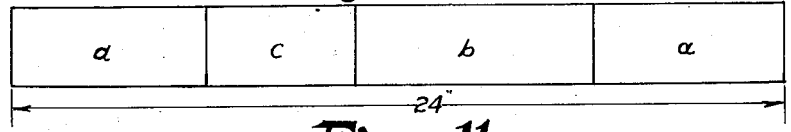
Figure 12:
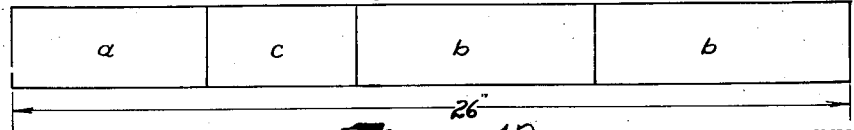

In Fig. 11 two mould sections $a$ and intermediate sections $a$ and $b$ are assembled in alinement to make a mold 24" in length, and in Fig. 12 two mould sections $b$ are assembled in alinement with mould sections $c$ and $a$ making a mould 26" in length.

Obviously the dimensions of the mould sections above described are merely illustrative and the general principle can be applied to produce mould articles of any desired length by providing a minimum number of interchangeable pairs of mould sections of different lengths thus to be assembled.

It will be understood that the particular embodiment of the invention shown and described herein is of an illustrative character and that various modifications may be made therein and that the invention may be applied to the moulding of any sort of articles of varying lengths within the spirit and scope of the following claims.

Having thus described the invention, what is claimed as new, and desired to be secured by Letters Patent, is:

1. Injection moulding apparatus comprising a frame having a base, a pair of narrowly spaced parallel standards extending upwardly from each end thereof, beams provided with complementary guideways throughout their length connecting the upper end portions of like end standards, a horizontal stationary die plate mounted at its end on like end standards provided with alined horizontal apertures, end mould sections and intermediate mould sections therebetween abutting end to end each detachably mounted on said stationary die plate, each mould section having a series of mould cavities with a runner therefor in end to end communication with the runner of an adjoining mould section, said end mould sections having sprues leading to the respective runners therein and registering respectively with the apertures in said stationary die plate, a relatively movable die plate having detachably secured thereto mould sections having cavities and runners complementary to those of the respective stationary mould sections, means for actuating said movable die plate forcibly and releasably to clamp the cooperating mould sections together, hydraulically actuated injection mechanisms adjustably mounted in said guideways having nozzles extending through the respective apertures in said stationary die plate communicating with the sprues of the stationary end mould sections operable simultaneously to supply mouldable material under high pressure through the respective sprues in the mould section into the runners and cavities of said assembled mould sections, whereby a series of moulded articles of any desired length may be simultaneously made by providing mould sections of suitable length intermediate of said end mould sections with the runners of said intermediate mould sections communicating with each other and with the runners of the end sections.

2. Injection moulding apparatus comprising a frame having a base with spaced standards extending therefrom, beams connecting said standards provided with complementary guideways throughout their lengths, a stationary die plate mounted on said standards having alined apertures therein, a plurality of alined mould sections detachably mounted on said stationary die plate in alined end to end abutting relation each having a series of cavities and runners therefor in end to end communication, the end mould sections having sprues leading to their respective runners and registering respectively with the apertures in said stationary die plate, a relatively movable die plate having detachably secured thereto mould sections having cavities and runners complementary to those of the respective stationary mould sections, means for actuating said movable die plate forcibly and releasably to clamp the cooperating mould sections together, hydraulically actuated injection mechanisms adjustably mounted in said guideways having nozzles communicating respectively with the sprues of the stationary end mould sections operable simultaneously to supply mouldable material under high pressure to the respective ends of the runner and therethrough to the communicating cavities of the respective mould sections, and adjustable means mounted on said frame for clamping the respective nozzles tightly upon the end mould sections in registry with the respective sprues thereof.

3. Injection moulding apparatus comprising a frame having a base with spaced standards extending therefrom, beams connecting said standards provided with complementary guideways throughout their lengths, a stationary die plate mounted on said standards below and parallel to said beam and having alined apertures therein, a plurality of mould sections detachably mounted on said stationary die plate in end to end abutting relation each having one or more cavities and a continuous runner communicating with the respective cavities of all the mould sections, the mould sections having sprues leading to their respective runners and registering respectively with the apertures in said die plate, a relatively movable die plate having detachably secured thereto mould sections complementary to the respective stationary mould sections, means for actuating said movable die plate forcibly and releasably to clamp the cooperating mould sections together, fluid actuated injection mechanisms adjustably mounted in said guideways having nozzles extending through the respective apertures in the stationary die plate and communicating respectively with the sprues of the end mould sections and having means for simultaneously supplying mouldable material under pressure to the respective ends of the runner and therethrough to the communicating cavities of the assembled mould sections, a girder connecting said standards having a channel in the plane of said nozzle, nuts adjustably mounted in said channel, screws mounted in said nuts adapted to engage the injecting mechanism in the direction of the axes of the respective nozzles operable to clamp the nozzles of the injecting mechanism firmly upon the stationary end mould sections in registry with the sprues leading to the respective ends of the runner.

ERNEST W. HALBACH.

REFERENCES CITED

The following references are of record in the file of this patent:

UNITED STATES PATENTS

| Number | Name | Date |
|---|---|---|
| 585,154 | Beddall | June 22, 1897 |
| 1,476,257 | Kralund et al. | Dec. 4, 1923 |
| 2,081,304 | Moluf | May 25, 1937 |
| 2,266,729 | Anderson | Dec. 23, 1941 |
| 2,293,304 | Muller et al. | Aug. 18, 1942 |
| 2,386,697 | Lynch | Oct. 9, 1945 |